United States Patent [19]

Brownscombe et al.

[11] Patent Number: 5,554,657

[45] Date of Patent: Sep. 10, 1996

[54] PROCESS FOR RECYCLING MIXED POLYMER CONTAINING POLYETHYLENE TEREPHTHALATE

[75] Inventors: Thomas F. Brownscombe, Houston; Howard L. Fong, Sugar Land; Zaida Diaz, Houston; Hoe H. Chuah, Houston; Raymond L. June, Houston, all of Tex.; Kevin L. Rollick, Munroe Falls, Ohio; Thomas C. Semple, Friendswood, Tex.; Mark R. Tompkin, Massillon, Ohio

[73] Assignee: Shell Oil Company, Houston, Tex.

[21] Appl. No.: 436,078

[22] Filed: May 8, 1995

[51] Int. Cl.$^6$ ................................ C08J 11/04; B03D 1/08
[52] U.S. Cl. ...................... 521/48; 521/46.5; 521/46; 528/308.1; 528/502 A; 209/166
[58] Field of Search ........................... 521/48, 46.5, 46; 528/308.1, 502; 209/166

[56] References Cited

U.S. PATENT DOCUMENTS

| | | | |
|---|---|---|---|
| 4,617,111 | 10/1986 | Grimm et al. | 521/46.5 |
| 5,120,768 | 6/1992 | Sisson | 521/46.5 |
| 5,198,471 | 3/1993 | Nauman et al. | 521/40 |
| 5,214,072 | 5/1993 | Fennhoft et al. | 521/40 |
| 5,234,110 | 8/1993 | Kobler | 521/48 |
| 5,266,601 | 11/1993 | Kyber et al. | 521/48 |
| 5,278,282 | 1/1994 | Nauman et al. | 521/40 |
| 5,380,793 | 1/1995 | Pepper | 521/48.5 |
| 5,451,611 | 9/1995 | Chilururi et al. | 521/48.5 |

*Primary Examiner*—Paul R. Michl
*Assistant Examiner*—Olga Asinovsky
*Attorney, Agent, or Firm*—Kim Muller

[57] ABSTRACT

The invention described herein provides a process for recycling a mixed polymer recycle stream containing polyester polymers, particularly polyethylene terephthalate (PET) typically in the form of carbonated soft drink or other containers. This novel process includes the steps of: (1) contacting the mixed polymer recycle stream with a solvent which selectively dissolves the PET. (2) separating the selective solvent containing PET from the residual mixed polymer, (3) cooling the selective solvent to precipitate the PET, and (4) removing the selective solvent from the precipitated PET. It is preferable that the mixed polymer recycle stream be prepared for recycling by conventional steps, such as water washing. In a preferred embodiment, the mixed polymer recycle stream is chemically washed subsequent to water washing and prior to contact with the selective solvent. The PET recovered is preferably combined with "virgin" PET and further processed to increase its molecular weight.

47 Claims, No Drawings

PROCESS FOR RECYCLING MIXED POLYMER CONTAINING POLYETHYLENE TEREPHTHALATE

FIELD OF THE INVENTION

This invention relates to a process for recovering polyester polymers from a mixed polymer recycle stream through use of a solvent that selectively dissolves polyester polymers and substantially rejects dissolution of most other polymers expected to be present in the mixed polymer recycle stream. More particularly, this invention relates to a process for recovering polyethylene terephthalate, typically in the form of carbonated soft drink bottles, from a mixed polymer recycle stream typical of that generated by curbside collection of post-consumer recycled plastics. The recovered polyethylene terephthalate is advantageously recycled by combining it with polyethylene terephthalate prepared from typical raw materials and increasing the molecular weight of the combination through additional processing.

BACKGROUND OF THE INVENTION

In an effort to minimize the environmental impact of disposable plastics, many municipalities are establishing curbside recycling programs. The mixed polymer recycle stream generated by such recycling programs contains a significant amount of polyethylene terephthalate (PET), typically present in the form of carbonated soft drink bottles. Such bottles are easily identified and may be selectively sorted from other plastics. However, selective sorting of carbonated soft drink bottles does not necessarily segregate PET from other plastics, since the structure of such bottles typically includes polyolefins (e.g. polypropylene caps and labels, and high density polyethylene base cups). If an attempt is made to include other PET bottles, which come in a variety of shapes and sizes, it is possible that some clear polyvinyl chloride and clear polystyrene bottles, or multi-layer bottles, will be included with the PET bottles. PET is also utilized for dual ovenable trays and other containers, which typically contain small amounts of other polymers for property improvement. Thus, the recycling of PET food trays provides another route for including other polymers with recycled PET.

A variety of methods have been proposed for recycling PET, with or without other polymers. On a commercial scale, PET is generally depolymerized to oligomers or PET monomers which are subsequently utilized as a raw material in the preparation of recycled PET resin. Such depolymerization provides a route for separating PET from other polymers. However, it would be preferable to avoid the processing costs associated with depolymerizing and then repolymerizing the PET polymer.

It is an object of this invention to recover polyester polymers, particularly PET, from a mixed polymer recycle stream through use of a solvent that selectively dissolves the polyester polymer while maintaining the polyester polymer as a polymer, and substantially rejects dissolution of other polymers present in the mixed polymer recycle stream.

SUMMARY OF THE INVENTION

The invention described herein provides a process for recycling a mixed polymer recycle stream containing polyester polymers, particularly polyethylene terephthalate (PET), typically present in the form of carbonated soft drink or other bottles. PET is recovered through use of a solvent that selectively dissolves polyester polymers and substantially rejects dissolution of most other polymers expected to be present in the mixed polymer recycle stream. This novel process includes the steps of: (1) contacting the mixed polymer waste stream with a solvent which selectively dissolves the PET, (2) separating the selective solvent containing PET from the residual mixed polymer waste, (3) precipitating the PET from the selective solvent solution, and (4) removing the selective solvent from the precipitated PET. It is preferable that the mixed polymer recycle stream be prepared for recycling by conventional steps, such as water washing. In a preferred embodiment, the mixed polymer recycle stream is chemically washed subsequent to water washing and prior to contact with the selective solvent. The PET recovered is preferably combined with "virgin" PET and further processed to increase its molecular weight.

DETAILED DESCRIPTION OF THE INVENTION

Process of the Invention

The process of the subject invention involves several steps. In its most basic embodiment, the process includes the steps of (1) contacting the mixed polymer recycle stream with a selective solvent, (2) separating the selective solvent solution containing polyester from the residual waste stream, (3) precipitating the polyester from the selective solvent solution, and (4) removing the spent selective solvent from the precipitated polyester. It is preferable for the mixed polymer recycle stream to be prepared for recycling by conventional methods, including water washing, prior to contacting the polyester with the selective solvent.

In a preferred embodiment of the invention, a chemical wash step is included subsequent to the standard water wash preparation, and prior to contacting the mixed polymer recycle stream with the selective solvent for polyester. In both of these embodiments, the recovered polyester is preferably combined with a "virgin" polyester that has been prepared from standard monomers (e.g. terephthalic acid and ethylene glycol), and the combination is further processed to increase its molecular weight. Alternatively, the recovered polyester may be further processed in isolation to form a product with 100% recycle content.

Mixed Polymer Recycle Stream

Polyester polymers include a variety of condensation polymers formed by the combination of a dicarboxylic acid or diester thereof and a dihydric alcohol or glycol. The polyethylene terephthalate (PET) in the recycle stream is typically comprised of repeat units which are derived from terephthalic acid or a diester thereof and ethylene glycol (1,2-ethanediol). However, it is understood that the PET can also be modified with small amounts of other monomers. Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of such a modified PET. For instance, a small amount of 1,4-butane diol or cyclohexanedimethanol can be utilized in the glycol component used in preparing the modified PET. Normally, no more than about 15 weight percent of the repeat units in such modified PET will be comprised of diacids (or diesters) or diols other than a terephthalic acid and ethylene glycol.

Other polyesters include polypropylene terephthalate (PPT), polybutylene terephthalate (PBT), polyethylene naphthalate (PEN), and polybutylene naphthalate (PBN). PPT is derived from terephthalic acid or a diester thereof and propylene glycol (e.g. 1,3-propanediol). PBT is derived from terephthalic acid or a diester thereof and 1,4-butanediol. PEN is derived from a naphthalene dicarboxylic acid, such as 2,6-naphthalene dicarboxylic acid, or a diester thereof, and ethylene glycol. PBN is derived from a naphthalene dicarboxylic acid or a diester thereof, and 1,4-butanediol. PET is the most common polyester currently present in the recycle stream, and will be used herein in an exemplary fashion. However, the subject invention is applicable to, and is intended to encompass, a variety of polyesters, alone or in combination.

The mixed polymer recycle stream collected by commercial recyclers (through curbside collections, etc.) will have PET contents ranging from 25 weight percent to 75 weight percent. For economic reasons, it is desirable: to increase the concentration of PET in this stream. This is typically accomplished by grossly separating the non-PET containers from the PET bottles. This can be accomplished either manually or with automatic equipment. Optionally, colored PET containers (e.g. green carbonated soft drink bottles) may be sorted out by the recycler, leaving a predominantly clear PET recycle stream. Bottle sortation will typically increase the PET content of the recycle stream to between 65 weight percent and 90 weight percent, and is typically limited by the foreign materials used for the containers' labels, lids, and basecups. The PET in the recycle feed stream is primarily derived from PET molded into bottles, trays, and other containers, but may also be derived from other articles, such as fibers, molded sheeting, blister packs, strapping, and film. The PET is typically crushed or ground into "flake" and charged into a water-filled vessel where many foreign plastics (high density polyethylene, polypropylene, expanded polystyrene, etc. ) will float and can be easily removed. By combining bottle separation and a simple sink/float step, the PET fraction can easily be concentrated to 90 weight percent or more.

PET beverage bottles are typically ground into flakes which have a cross-sectional area of from about 10 mm$^2$ to about 150 mm$^2$. It is more typical for such flakes to have an area of about 40 mm$^2$ to about 100 mm$^2$. The thickness of the flakes varies with the wall thickness of the bottles which are being recycled. The PET can contain catalyst deactivators, such as phosphates, and other additives, such as impact modifiers, process aids, fillers, pigments and dyes (organic and inorganic), ultra-violet light stabilizers, and anti-degradants.

The process of the invention is directly applicable to a mixed polymer recycle streams containing a variety of PET contents. It is desirable to utilize the process of the invention on a mixed polymer recycle stream that contains a very high proportion of PET, since the efficiency of the process will increase with increasing PET content in the recycle stream. However, one of the advantages of the subject invention is its ability to process mixed polymer having PET contents typically available from recyclers at a reasonable cost. The process is applicable to recycle streams containing 35 weight percent to 50 weight percent PET or more, and can be efficiently utilized for recycle streams containing from about 50 weight percent to about 90 weight percent PET, based upon total recycle stream weight. It is preferable for the mixed polymer recycle stream to have a PET content of from about 65 weight percent to about 90 weight percent PET, based upon total recycle stream weight, and most preferable for the mixed polymer recycle stream to have a PET content of from about 80 weight percent to about 95 weight percent PET, based upon total recycle stream weight. The mixed polymer recycle stream could have a PET content as high as 100 weight percent PET, based upon total recycle stream weight.

It is preferable for the mixed polymer recycle stream to have been water-wash by the recycler. Colored PET articles may be included, but will have an impact upon the color of the PET recovered by the process. Consequently, it is preferable for the mixed polymer recycle stream to contain predominantly clear polymers. Although it is desirable to have non-PET polymers removed to the extent practical, one of the advantages of the subject invention is that it can accommodate the presence of other polymers (e.g. ethylene vinyl acetate, polyvinyl chloride, polyethylene, polypropylene, and polystyrene) in the mixed polymer recycle stream.

Chemical Wash Step

It is preferable that the mixed polymer recycle stream be chemically washed prior to contact with the selective solvent for PET.

In the chemical wash step, the PET is contacted with a chemical wash solvent to remove various impurities in the mixed polymer recycle stream. Such impurities include, for example, glues, inks, toxic materials such as pesticides, and organoleptic materials. The chemical wash solvent is also capable of removing selected non-PET polymers, such as polyvinyl chloride and polystyrene, from the mixed polymer recycle stream. In addition, the chemical wash solvent serves to reduce the water content, which may also be considered an impurity, of a water-washed mixed polymer recycle stream.

The chemical wash solvent of the invention is a solvent that will selectively dissolve at least polyvinyl chloride, and preferably polystyrene as well, while not dissolving, or depolymerizing, to any significant degree, PET. Preferred chemical wash solvents dissolve less than 1 part per hundred (pph) PET, measured as parts PET per hundred parts of solvent at room temperature. Suitable chemical wash solvents may be broadly classified as moderately polar, oxygenated hydrocarbon materials that will not depolymerize the PET and generally have boiling points from about 50° C. to about 200° C., to allow efficient dissolution of polyvinyl chloride and/or other polymers present in the mixed polymer recycle stream. Such oxygenated hydrocarbons include esters, ethers, and ketones with a total of three to sixteen carbon atoms. Such oxygenated hydrocarbons may be aliphatic or cyclic, but are generally non-aromatic. When the compounds include alkyl groups, such alkyl groups generally contain from one to four carbon atoms.

A preferred group of chemical wash solvents includes methyl ethyl ketone, tetrahydrofuran, tetrahydropyran, cyclopentanone, alkyl-substituted cyclopentanones, hexanones, hexanediones, heptanediones, octanediones, alkyl malonates, diol diacetates (e.g. ethylene glycol diacetate, propanediol diacetate, and butanediol diacetate), alkyl-substituted acetoacetate, 1,3-dioxane, 1,4-dioxane, 1,3-dioxolane, 2-methoxyethyl ether, diethoxymethane, cyclohexanone, alkyl-substituted cyclohexanones, cycloheptanone, alkyl-substituted cycloheptanones, amyl acetate, amyl propionate, mesityl oxide, dibutyl phthalate, and dialkyl formamide, all of which will dissolve both polyvinyl chloride and polystyrene. Any of these chemical solvents may be used wet, in combination with water. For example, an azeotropic mixture of tetrahydrofuran and water may be employed as the chemical wash solvent. Cyclohexanone, cycloheptanone, alkyl-substituted cyclohexanones, alkyl-substituted cycloheptanones, amyl acetate, amyl propionate, diol diacetates, dibutyl phthalate, heptanediones, and mesityl oxide are particularly useful if polyolefins are present in the mixed polymer recycle stream, since these solvents dissolve polyolefins, in addition to dissolving polyvinyl chloride and polystyrene.

The chemical wash solvent is contacted with the mixed polymer recycle stream in ratios of from about 0.5:1 to about 10:1, based upon weight of chemical wash solvent to mixed polymer. Preferably, the chemical wash solvent is contacted with the mixed polymer recycle stream in ratios of from about 1:1 to about 3:1, based upon weight of chemical wash solvent to mixed polymer. The chemical wash step may be completed with one cycle of contacting the chemical wash solvent with the mixed polymer, or multiple washes may be employed. When multiple washes are employed, the ratio of solvent to polymer is lower than for a single wash, and may provide a cleaner product. Continuous washing may also be used, with further reduction in the amount of wash solvent required per weight of polymer. Countercurrent washing is another useful method.

The chemical wash solvent may be employed at ambient temperatures and under mild conditions. To minimize the contact time required, it is generally preferable to utilize the chemical wash solvent at elevated temperatures, preferably from about 50° C. to about 200° C. Lower temperatures may be required depending upon the boiling point of the chemical wash solvent. For example, when cyclohexanone is employed, the preferred temperature range is from about 125° C. to about 160° C. The upper temperature limit is determined by the boiling point of the chemical wash solvent and the stability of the polymers, and should not be so high as to decompose the polymers. The amount of contact time required to substantially dissolve polyvinyl chloride and/or other polymers present will vary depending upon the solvent and the wash temperature, but will generally be from about 5 minutes to about 60 minutes.

The chemical wash step is preferably conducted at or near atmospheric pressure, although higher pressures may be used. The PET may be contacted with the chemical wash solvent by any conventional method, and using conventional equipment for the operating conditions employed. The chemical wash step is conducted, for example, by combining the PET and the chemical wash solvent in a stirred tank reactor. The resulting contaminated chemical wash solvent may be separated from the residual mixed polymer recycle stream through a gravity separation, filtration, screening, centrifugation, or other equivalent methods.

It is preferable to remove as much of the chemical wash solvent as is practical from the chemically-washed residual mixed polymer, since any entrained chemical wash solvent will retain the impurities removed from the mixed polymer. A preferred method of separating the chemical wash solvent from the residual mixed polymer includes removal of the chemical wash solvent by gravity separation followed by displacement with another solvent, which may be the selective solvent for PET.

PET Dissolution Step

In the PET dissolution step, the PET is contacted, at an elevated temperature, with a selective solvent, to form a solvent solution containing PET. The solvent selectively dissolves PET while maintaining the PET in polymer form, and substantially rejects dissolution of the other polymers present in the mixed polymer recycle stream. The size of the PET particles affects the rate of dissolution of the PET in the selective solvent (small particles dissolve more quickly than larger particles because of larger surface area exposed to the solvent). Agitation of the PET particles in the selective solvent will speed dissolution of the PET, as will increasing the temperature of the selective solvent, as long as the temperature is not so high as to cause decomposition in the polymers present.

The selective solvent of the invention is a solvent that selectively dissolves PET without significantly dissolving other polymers that may be present, such as polyethylene, polypropylene, polystyrene, and polyvinyl chloride. Some molecular weight reduction in the PET is expected to occur, but the PET is maintained in a polymer form. The molecular weight reduction that occurs in the PET is accommodated through subsequent processing to re-build the molecular weight.

Suitable selective solvents may be broadly classified as moderately polar, aprotic materials that do not depolymerize the PET and have boiling points greater than about 180° C., to allow efficient dissolution of PET at an elevated temperature. It is preferable for such solvents to substantially reject dissolution of polymers other than PET. Preferred solvents dissolve less than 1 pph of other polymers that may be present in the mixed polymer recycle stream, measured as parts of polymer individually dissolved in a given solvent at elevated temperature (typically 170° C. to 250° C.). Such solvents includes diethyl glutarate, dimethyl succinate, dimethyl sulfoxide, diphenyl sulfone, phenol, and sulfolane.

A preferred group of solvents include, those which are considered "native" to the polyester polymer recovered, meaning that the solvent is, or may decompose to form, raw materials that are useful in making PET and similar polyester polymers. Dicarboxylic acids, such as terephthalic acid, and glycols, such as ethylene glycol, are not encompassed within this group of solvents since these materials will depolymerize the PET. However, diesters of the dicarboxylic acids, such as dimethyl terephthalate, and ethylene carbonate, which will decompose to form ethylene glycol and carbon dioxide on exposure to water, are encompassed within this group of solvents. Specifically, a particularly preferred group of selective solvents includes dialkyl terephthalates, dialkyl phthalates, dialkyl isophthalates, dialkyl naphthalates, and mixtures thereof, and alkylene carbonates and mixtures thereof. Specific examples of particularly preferred selective solvents include dimethyl terephthalate, dimethyl phthalate, diethyl terephthalate, dimethyl isophthalate, dimethyl 2,6-naphthalene dicarboxylate, and mixtures thereof, and ethylene carbonate, propylene carbonate, and mixtures thereof.

Although these preferred selective solvents are characterized as nondepolymerizing, some molecular weight reduction may occur in the PET coincident with dissolution in the solvent. The amount of molecular weight reduction which occurs may be controlled through careful selection of the selective solvent, and by minimizing the amount of impurities present in the selective solvent. Some water is expected to be present in the selective solvent, and/or carried with the mixed polymer waste stream, which will result in some hydrolysis and molecular weight reduction of the PET polymer. In addition, some of the preferred selective solvents, such as ethylene carbonate, are expected to generate decomposition byproducts through use in the process, particularly at elevated temperatures. The presence of ethylene glycol (a decomposition byproduct) in the ethylene carbonate solvent will also cause a molecular weight reduction in the PET polymer. In addition, other glycols may be present in ethylene carbonate or the other alkylene carbonate solvents. The diesters appear less susceptible to the generation of such impurities, and provide a higher molecular weight retention in the recovered PET product.

It is a further aspect of this inventory that the presence of impurities in the selective solvent may be utilized to control the molecular weight or intrinsic viscosity of the recovered PET product. For example, if an alkylene carbonate such as ethylene carbonate is utilized as the selective solvent, it will contain some impurities, such as water and ethylene glycol, which will hydrolyze and reduce the molecular weight of the recovered PET product. Some impurities, such as ethylene glycol, may be generated through use of the ethylene carbonate under normal operating conditions. The level of such impurities may be controlled or maintained (through addition or removal of the impurities from the selective solvent) at levels that will provide a recovered PET product with a given molecular weight or intrinsic viscosity. Other variables, such as PET contact time with the selective solvent, and the temperature of the selective solvent, will also influence the recovered PET product. Those skilled in the art will be able to adjust the digestion time, temperature, and levels of impurities to achieve the desired molecular weight or intrinsic viscosity for the recovered PET product, to allow optimum use of the PET product in subsequent processing.

Minimizing the presence of water, ethylene glycol, and other materials that will cause molecular weight reduction in the PET polymer is an alternative, and may be achieved through use of relatively pure solvents and by maximizing water removal from the PET subsequent to water washing. For example, when ethylene carbonate is used as the selective solvent, it is preferable for the ethylene carbonate to contain less than 35 parts per million (ppm) water and less than 25 ppm ethylene glycol. A preferred method for reducing the impurities, such as water, from ethylene carbonate is through the use of zeolite or molecular sieve adsorbents. Although some molecular weight reduction in the PET is expected to occur, the polyester polymer is maintained in polymer form. For example, the polyester polymer should contain at least 16 repeating units in the polymer chain. One of the unique aspects of the subject invention is the advantageous utilization of the recovered PET through subsequent processing to rebuild its molecular weight.

It has been found that the aromatic ester selective solvents, such as dimethyl phthalate, provide a higher molecular weight PET polymer recovered after dissolution, due to greater molecular weight retention through the dissolution step. This molecular weight retention is advantageous in that less processing is required to rebuild the molecular weight in the recycled PET polymer product.

The alkylene carbonates also offer a surprising advantage. Although the molecular weight of the PET polymer recovered after dissolution in the selective solvent may be lower due to the presence of impurities present in the alkylene carbonates, the molecular weight distribution of the recovered PET polymer indicates a polydispersity of about 2, essentially the same as that of a virgin melt polymerized PET polymer, even when the mixed polymer recycle stream has a polydispersity of greater than 2. This indicates the PET polymers present in the mixed polymer recycle stream are substantially equilibrated, with the high and low molecular weight fractions adjusted to provide a polydispersity of about 2. If it is desirable to obtain a recovered PET polymer with a polydispersity comparable to virgin polymer, use of the alkylene carbonate selective solvents is preferred. If it is preferable to maintain the polydispersity of the mixed polymer recycle stream, use of the aromatic ester selective solvents is preferred.

The amount of selective solvent used should be sufficient to dissolve the PET in a reasonable amount of time. The selective solvent is contacted with the mixed polymer recycle stream in ratios of from about 1:1 to about 19:1, based upon total weight of selective solvent to PET present in the mixed polymer. Preferably, the selective solvent is contacted with the mixed polymer recycle stream in ratios of from about 1.5:1 to about 9:1, based upon total weight of selective solvent to PET. Most preferably, the selective solvent is contacted with the mixed polymer recycle stream in ratios of from about 2:1 to about 5:1, based upon total weight of selective solvent to PET.

The selective solvent is contacted with the mixed polymer recycle stream in amounts sufficient to produce a selective solvent solution containing from about 5 weight percent to about 50 weight percent PET, preferably from about 10 weight percent to about 40 weight percent PET, and most preferably in amounts sufficient to produce a selective solvent solution containing from about 15 weight percent to about 35 weight percent PET in the selective solvent.

The selective solvent is employed at elevated temperature, to ensure efficient dissolution of the PET. The selective solvent and PET are contacted at temperatures of from about 140° C. to 285° C., preferably at temperatures of from about 170° C. to 250° C., and most preferably at temperatures of from about 200° C. to about 230° C.

The PET dissolution step is preferably conducted at or near atmospheric pressure, although higher pressures may be used. The PET may be contacted with the selective solvent by any conventional method, and using conventional equipment for the operating conditions employed. The PET dissolution step is conducted, for example, by combining the PET and selective solvent in a stirred tank reactor. The resulting solvent containing PET may be separated from the residual waste stream through filtration, gravity separation, or other equivalent means, and using conventional equipment.

Unless the polyolefins present in the mixed polymer recycle stream are removed prior to dissolution of the PET, any polyolefins present will melt and form a liquid phase separate from the selective solvent for PET. Also, if the PET contains encapsulated polyolefins (e.g. PET trays containing a small portion of a polyolefin), dissolution of the PET in the selective solvent may liberate the encapsulated polyolefins, contributing to the polyolefins layer. This polyolefin layer, which typically floats on top of the solvent, is removed from the solvent by phase separation, skimming, or other equivalent means. The residual waste stream, from which the selective solvent is separated, contains aluminum, glass, rocks, cellulose, wood, rubber, etc.

PET Recovery

The selective solvent containing dissolved PET, after separation from the residual waste stream and any polyolefins present, can be separated from the PET by precipitating the PET as a fine powder. The selective solvent is then removed from the PET, resulting in a recovered PET product that may be processed further to increase its molecular weight.

As is known to those skilled in the art, precipitation of the PET may be induced by either cooling the selective solvent to reduce the solubility of the PET in the selective solvent or by adding a second solvent, referred to as a nonsolvent, to the selective solvent which results in the rapid precipitation of the PET as a fine powder. U.S. Pat. No. 4,064,079 serves as a reference for the recovery of PET by temperature swing crystallization and G.B. 1,201,523 serves as a reference for the recovery of PELT by nonsolvent addition to a solvent.

Nonsolvents for PET may be chosen from a broad category of materials. They are in general less polar than the selective solvents. Another criteria for selection is that they should possess lower boiling points than the selective solvent for ease of recovery and recycle. They should also be soluble with the selective solvent over the desired range of operating conditions. A convenient choice is to use the chemical wash solvent to reduce the equipment required for solvent recycle.

It should be noted that precipitation of the PET from the selective solvent is noted almost immediately upon the addition of the non-solvent to selective solvent and PET mixture. In addition to the use of a backmixed vessel, numerous devices, such as fluidic mixers, static mixers, and high shear pumps, can serve to rapidly mix the two streams. Such devices can accomplish the complete precipitation of the PET from the selective solvent as a fine powder in less than 30 seconds. This precipitation can occur in a line, minimizing the need for long residence time vessels downstream of the mixer.

With either method of precipitation, it is necessary that considerable heat be removed from the solvent solution. This may be accomplished by a number of methods, two of which are described here. In the first method, the PET powder/selective solvent slurry is circulated over externally cooled heat transfer surfaces to remove heat from the vessel. The heat transfer surfaces are generally cooled with water, although other mediums, such as oil or other process streams requiring heat, may be used. With this mode of operation, the cooled heat transfer surfaces sometimes experience significant fouling by the precipitation of the PET product, or a mixture of PET product and solvent. The fouling can significantly reduce heat transfer rates which is detrimental to operation of the precipitation vessel.

A second option for heat removal from the solvent solution is the utilization of reflux cooling. In this mode of operation, a precipitation vessel may be used, and operated by the manipulation of its internal temperature and pressure so that the selective solvent mixture, or nonsolvent plus selective solvent mixture, boils to remove the heat required for the precipitation of the PET. The advantage of reflux cooling is that the heat transfer surfaces do not foul rapidly. This is because the cooling of the PET powder slurry is accomplished by boiling the selective solvent mixture, or nonsolvent plus selective solvent mixture, in the precipitation vessel. The externally cooled heat transfer surfaces are never exposed to the PET slurry which has a tendency to foul cool surfaces.

In the case of a reflux cooled precipitator, a second solvent, called a reflux solvent, can be added to the vessel to favorably adjust the boiling point of the PET powder/selective solvent slurry. This might be done so that vacuum operation of the precipitator vessel is not required to boil the selective solvent mixture at the desired precipitation temperature. The reflux solvent can also act as a nonsolvent to aid in the precipitation of the PET powder from the selective solvent. Note that it is not generally required that the reflux solvent be soluble in the selective solvent, but it is required that the reflux solvent not react with the selective solvent. It is convenient to utilize the chemical wash solvent as a reflux solvent. To decrease the viscosity of the PET slurry, the selective solvent, or mixture of nonsolvent and selective solvent, or mixture of reflux solvent and selective solvent, can be recirculated to the precipitation vessel to lower the solids concentration in the precipitation vessel. For use as a viscosity reducing solvent, the reflux solvent or nonsolvent material recirculated should be soluble in the selective solvent to provide maximum viscosity reduction.

The desired ranges of solids concentrations in the precipitator vessel, or other device used to precipitate the PET, are generally less than those in the PET digester vessel. The PET may be present in concentrations of from about 1 weight percent to about 50 weight percent, preferably from about 5 weight percent to about 30 weight percent, and most preferably from about 5 weight percent to about 15 weight percent.

To precipitate the PET from the selective solvent, the solution containing PET must be cooled to a temperature in the range of from about 60° C. to about 160° C. The solution is preferably cooled to a temperature in the range of about 60° C. to about 140° C. This cooling is preferably conducted at or near atmospheric pressure, although lower or higher pressures may be used.

When the formation and precipitation of PET crystals occur in a short period of time, a separate precipitation vessel may be unnecessary, and intermediate piping may be sufficient to allow precipitation of the PET. The specific equipment employed will depend, for example, upon the method of heat removal selected, and the time required for precipitation of the PET.

The length of time required to precipitate the PET will vary, depending upon how fast the selective solvent solution is cooled, the temperature to which the solution is cooled, and the method of cooling employed. A time period of 1 minute or less to 1 hour is typically sufficient, and a time period of 15 minutes to 30 minutes is preferred. It is of course preferable to recover as much of the PET as is practical using the methods employed.

After precipitation of the PET powder, the PET can be separated from the selective solvent (or the selective solvent/nonsolvent mixture or the selective solvent/reflux solvent mixture) by either filtration or density based separation methods. Unless the PET crystals have agglomerated, they are generally quite small with a diameter of about 20 microns or less. Due to the difficulty in efficiently recovering small diameter particles by centrifugation, recovery of the PET is preferably by filtration. A large number of continuous or batch filter designs are available and are known to those skilled in the art. The most preferred configuration is a rotary drum filter, such as those manufactured by the Bird Machine Co. The rotary drum filter removes a thin, self filtering cake from the solvent mixture which can be washed on the drum in a continuous wash zone.

It is desirable to remove as much of the high boiling selective solvent as possible to ease the devolatilization of the PET powder. It is also preferable to remove as much of the selective solvent as is practical from the recovered PET product, since any entrained or occluded solvent may contain undesirable impurities or cause problems in subsequent processing. A suitable wash solvent can be chosen by the same general criteria used to select a nonsolvent or reflux solvent for the precipitation vessel. It should dissolve the selective solvent in the desired range of operations and it should be more volatile for ease of recycle and recovery. The preferred solvents are those chosen for the chemical wash and (optionally) reflux cooling solvents. For example, the selective solvent may be removed from the PET by gravity separation, followed by displacement with another solvent, which may be the chemical wash solvent.

Although it is preferable to recover PET with a molecular weight comparable to that of the PET in the recycle polymer stream, in general, the process of the invention will cause some molecular weight reduction in the recovered PET product. The recovered PET of the invention is advantageously utilized through additional processing to increase its molecular weight.

Subsequent Processing

In a typical PET polymerization process, the terephthalic acid (or dimethyl terephthalate) and ethylene glycol are combined and polymerized in a liquid or melt phase. The melt phase polymerization process typically involves a series of reactors in which the molecular weight of the polymer is sequentially increased, until the PET reaches an intrinsic viscosity (IV) of from about 0.4 dl/g to about 0.6 dl/g, equivalent to a number average molecular weight of about 10,200 to about 18,600. At this point, the melt polymer becomes too viscous to further polymerize in the liquid state. The melt polymer is extruded, cooled, and pelletized to form an amorphous prepolymer product. This prepolymer is subsequently heated to increase its crystallinity, and then further polymerized in the solid state to an IV of about 0.7 dl/g or more, preferably to an IV of about 0.8 dl/g or more.

One of the novel aspects of the subject invention is combining the recovered PET product with PET manufactured from typical raw materials, for further processing. For example, the recovered PET may be added to a melt phase polymerization reactor that contains polymer having about the same IV range as that of the recovered PET. The PET may or may not be further polymerized in the melt phase. Alternatively, if the recovered PET has an IV comparable to the melt polymer being extruded, the recovered PET may be combined with virgin PET prior to entering the extruder, or in the extruder. The recovered PET may also be combined with virgin PET in other melt processing operations, such as a pelletizer or a spinarette in a fiber-making operation.

One of the advantages of combining the recovered PET with virgin PET not obtained from recycled PET is that it facilitates production of a PET product containing less than 100% recycled PET. Commercially available recycle-content PET resins currently contain less than 50 weight percent recycled PET. A recycle content of from about 15 weight percent to about 35 weight percent is typical, and a recycle content of about 25 weight percent is common. Production of a PET resin containing 100 percent recycle content is technically feasible with the subject invention, and may be useful for some applications.

Recovered PET Product Characteristics

The molecular weight of the recycle PET recovered will vary, depending upon the solvents employed and the operating conditions utilized in the process of the invention. It is desirable to obtain a recovered PET product which has an IV of from about 0.2 dl/g to about 0.8 dl/g. When the recovered PET is combined with virgin polyester for subsequent processing, the recovered PET preferably has an IV of from about 0.2 dl/g to about 0.6 dl/g. If the recovered PET is directly employed without subsequent processing to increase its molecular weight, it is generally preferable for the recovered PET to have a higher IV, such as from about 0.4 dl/g to about 0.8 dl/g. IV is typically used as an indicator for the molecular weight of polyester polymers, however, such polymers can also be characterized by number average molecular weight. It is desirable to obtain a recycled PET product which has a number average molecular weight of from about 3700 to about 30,000. When the recovered PET is combined with virgin polyester for subsequent processing, the recovered PET preferably has a number average molecular weight of from about 3700 to about 18,600. When the recovered PET is used undiluted, it preferably has a number average molecular weight of from about 10,200 to about 30,000.

IV is defined as the limit of the fraction (ln v)/C as C, the concentration of the polymer in solution, approaches zero, wherein v is the relative viscosity which is measured for several different polymer concentrations in a given solvent. For PET, a mixed solvent system of 60:40 phenol:tetrachloroethane is employed at 30° C. Different solvent systems may be employed for other polyester polymers, depending upon the molecular weight of the polyester.

Molecular weight distributions for the PET polymers were determined using Gel Permeation Chromatography (GPC). PET samples for GPC analysis were prepared by dissolving PET in hexafluoroisopropanol at a concentration of 0.5 to 1.0 milligram of PET per milliliter of solvent. The GPC system employed columns filled with either silica or styrene divinyl benzene beads. The GPC system was equipped with detectors that were calibrated to known PET standards. These values were then recalibrated against known PET IV standards to calculate the values reported as number average molecular weight.

The color of the recovered PET product may be measured by various conventional methods, as explained below. Impurities present in the PET polymer itself, in addition to impurities present in the post-consumer PET recycle stream, are a source of color in the recovered PET product. It is highly desirable for the recovered PET product to be as white as possible, since any color present will be transferred to the final PET product. To produce clear bottles, for example, the PET must be a colorless white polymer.

White light, i.e. sunlight, can be split into its component colors by passing it through a prism or by use of a diffraction grating. This color spectrum can then be recombined to produce white light. In practice it is possible to recreate white light by combining just three selected color lights such as the three primary color lights—green, blue, and red. Substances which appear colored in transmitted light (a glass or a bottle, for example) do so because there are absorbing light in a complimentary portion of the spectrum. For example, an item which appears yellow is absorbing violet/blue light. The process of additive mixing can also be used to create the secondary colors: green and red light give yellow, red and blue give magenta, and blue and green give cyan.

The International Commission on Illumination (Commission Internationale de l'Eclairage, CIE) in 1931 developed standardized methodology for quantifying color using the theory of the trichromacy of vision. The CIE defined a standard observer based on data from visual experiments in which human observers matched color of the spectrum by mixtures of the 3 primary lights. The angle of incidence on the retina was set at 2°. Values of spectral intensity from a defined standard illuminant were also set. From this data the CIE established the X, Y, Z Tristimulus scale, which is capable of defining any color with three numbers. The CIE—X, Y, Z Tristimulus scale is useful for determining if two colors match under a given set of conditions and can reveal why they do not match under different conditions. However, it is not useful for quantitative determinations of color differences because it is non-linear.

Attempts to modify the CIE—X, Y, Z color system to create a more uniform color space began shortly after it was issued. A number of color systems have been proposed and widely used, including the CIE—L*, u*, v* scale, the CIE—L*, a*, b* scale, the Hunter L, a, b scale, and the Gardner $R_d$, a, b scale. All are non-linear transformations of the CIE—X, Y, Z data to a color sphere and as such each can be converted to the others. Each scale is similar in that it has a lightness scale (black to white) and two opponent color coordinates i.e. a or a* which indicates redness (negative values, greenness) and b or b* denoting yellowness (negative values, blueness). Total color difference ($\Delta E$) and chromaticity differences ($\Delta C$) can then be calculated as:

$$\Delta E = [(\Delta L)^2 + (\Delta a)^2 + (\Delta b)^2]^{1/2}$$

$$\Delta C = [(\Delta a)^2 + (\Delta b)^2]^{1/2}$$

Other relationships for comparing color are known to those skilled in the art. Because of the treatment of data, variation in equipment, errors in measurement, etc., studies of large or very small differences do not appear to be consistent.

In addition to the limitations mentioned above, sample measurements, especially in reflectance mode, can be affected by shape and size of the analyte. This is especially true in the polymer industry where samples may be obtained as pellets, cubes, ground recycle flakes of various sizes and shapes, powders, and variously shaped finished articles. A further complication within the polyester industry lies in the fact that the sample may be amorphous and clear, crystalline and opaque, or strain crystallized and clear. Significant variations will be observed between sample forms, especially clear and opaque.

Typical raw product specifications for crystallized PET pellets in the polyester industry require brightness measured as a minimum $R_d$ of 40 or $L^*$ of 69.5, and yellowness limited to a maximum b of 2.0 or $b^*$ of 2.2.

For this work, color measurements were made using either the HunterLab ColorQUEST Spectrocolorimeter Sphere or the Hunter Labscan 6000. In either case, after following the recommended standardization procedure a sample of flake or powder is placed in the sample cup and placed over the sample port. The light shield is put in place to prevent stray room light from entering the detector and the measurement is taken. The sample cup is emptied and refilled taking at least 2 more measurements and the values averaged by the associated software. Results are output either as $L^*$, $a^*$, $b^*$ or $R_d$, a, b using internally preprogrammed mathematics.

The ColorQUEST Spectrocolorimeter Sphere is also capable of measuring haze in bottles, film, or sheet. Haze is a measure of the relative amount of light scattering on transmission through a material. It is calculated from the ratio of diffuse light transmitted through the material and the total light transmitted in air. A value of 0% haze indicates a perfectly clear, transparent material and a value of 100% haze indicates an opaque material. After standardization of the instrument, the bottle or other sample is placed in the holder in the haze compartment and measurements are taken as described by the manufacturer. In the case of bottles, four measurements are taken, rotating the bottle between measurements to get an average around the entire circumference. Multiple readings are also taken for other samples and averaged.

Readings obtained on the $R_d$, b scale may be converted to $L^*$, $b^*$ readings using the following equations:

$$L^* = (24.99 \, R_d)^{1/3} - 16$$

$$b^* = 43.09 \left[ R_d^{1/3} - \left( R_d - 1.4284 \frac{b}{f} \right)^{1/3} \right], \text{ where}$$

$$f = \frac{0.51(105 + R_d)}{5 + R_d}$$

The invention is further illustrated by the following illustrative examples, which are not to be construed as limiting the invention.

EXAMPLE 1

Ground post consumer recycle (PCR) clear PET bottles, as received from a recycler, were washed with a 3:1 water to flake ratio on a weight basis, and hand agitated for 10 minutes in a open top vessel at about 80° C. While highly variable, a typical sample of the clear PCR flake contains about 78 weight percent PET, 15 weight percent polyolefins, 5 weight percent paper, and about 2 weight percent other materials. The IV of the PET present in the PET granulate was about 0.76. The chlorine level in the PCR flake, as determined by X-ray florescence was typically 45 to 65 ppm. A small amount (about 1 weight percent) of Oakite RC-23, a mixture of ionic and non-ionic surfactants, was added to the deionized wash water to aid in the washing process. At the end of the wash step, the wash water was decanted. During the decanting step, a significant amount of floating material was discharged with the decanted wash water. The floating material consisted primarily of polyolefins (bottle caps and basecups) and paper (from labels, etc.). A small amount of PET was entrained in the floating material and lost. The first water wash was slightly discolored by dissolved and suspended organic material from the PET flake. The second water wash was carried out without any surfactant and removed no detectable color from the PET flake. It served mainly to displace entrained wash water from the first wash. The two water washes removed approximately 90 to 95 percent of the paper and polyolefins from the raw PCR flake.

A 2 liter resin kettle was charged with 250 g of the washed PCR flake. To remove any residual water, the washed flake sample was dried overnight in a vacuum oven at 150° C. and 29 inches mercury vacuum. The kettle, was equipped with a heating mantle, overhead condenser, agitator, and nitrogen purge system. The kettle was then charged with 1440 g of ethylene carbonate (EC) that had been dried to a water content of less than 35 ppm by nitrogen stripping at 125° C. Water content was determined via Karl Fischer titration. Ethylene glycol content of the EC was determined by gas chromatography and was less than 25 ppm. After about 30 minutes of heating, the vessel contents reached a temperature of 200 C. During the heating period, the headspace of the vessel was swept with two standard cubic feet per hour (SCFH) of dry nitrogen. The temperature was then held in the 190° to 200° C. range for an additional 15 minutes to insure that all of the PET flake had been dissolved. During the digestion portion of the run, the vessel was agitated at about 500 rpm.

After the digestion was complete, the kettle was allowed to sit for 5 minutes so that any entrained polyolefins could float to the top and form a second phase. The EC/PET solution was then strained through a filter pack containing a 200 mesh stainless steel screen to remove any large insoluble particles such as paper and aluminum and the agglomerated polyolefin layer.

After straining, the EC/PET solution was added to a 4 liter kettle containing a 960 g heel of EC at 60° C. to prevent thermal shock to the glass vessel. The kettle was equipped with an agitator, thermocouple, heating mantle, and nitrogen purge system. This kettle served to recover the PET as a fine-slurry by precipitating the PET at a lower temperature. After adding the EC/PET solution over a period of 2 minutes, the vessel was allowed to cool to 70° C. over a period of about 1 hour. The PET slurry was then discharged into a Buchner funnel with Whatman number 540 filter paper. Molten EC was drained from the filter cake. After the bulk of the EC had drained from the filter cake, it was reslurried three times with 750 ml aliquots of technical grade acetone to remove adhering and entrained EC.

The PET product was dried overnight in a vacuum oven at 150° C. and 29 inches mercury vacuum to remove residual solvent. The recovered PET, after drying, weighed 191 g, for a recovery of 76 percent. The recovered PET was analyzed to determine its IV and chlorine content. The PET product had, an IV of 0.587 dl/g, and a chlorine content (determined by X-ray fluorescence) of less than 25 ppm. For the recovered powder, the color parameters are: $R_d$=70.7, a=−1.00, b=3.24.

EXAMPLE 2

A 500 g sample of the water-washed PET (prepared as in Example 1) was transferred to a three necked, 5 liter round bottom flask. The flask was equipped with a heating mantle, thermowell and thermocouple, overhead stirrer, reflux condenser, and a nitrogen purge. The flake was chemically washed by adding 2600 g of tetrahydrofuran (THF) to the flask, heating to 60° C. and agitating the mixture with an overhead stirrer. After reaching 60° C. the chemical wash was carried out for an additional 20 minutes. At the end of the wash, the spent THF was removed by vacuum aspiration. The spent THF was badly discolored with color bodies from the PET flakes. Organics, colorants, adhesives, polyvinyl chloride, etc., were all expected to be removed by the chemical wash solvent. A second chemical wash step was carried out in a manner identical to the first. The THF was again removed by vacuum aspiration. The cleaned PET flake was then transferred to a Buchner funnel. The funnel served to remove THF held in interstitial voids by drawing air through the flakes. After a time of at least an hour in the Buchner funnel, the flakes were transferred to a vacuum oven where they were held at 70° C. and 29 inches mercury vacuum overnight to remove residual THF.

The chemically washed PET flake was then charged to a 2 liter autoclave equipped with an oil jacket, agitator, and nitrogen purge system. The autoclave was then charged with 1420 g of EC (the selective solvent) that had been dried to a water content of less than 35 ppm by nitrogen stripping at 125° C. Water content was determined via Karl Fischer titration. The EC also contained 500 ppm to 700 ppm ethylene glycol, as determined by gas chromatography. After about 90 minutes of heating, the oil reached a temperature of 225 ° C. in the dissolver and the vessel contents reached a temperature of 190° C. to 200° C. During the heating period, the headspace of the vessel was swept with 2 SCFH of dry nitrogen. The temperature was then held in the 190° C. to 200° C. range for an additional 15 minutes to ensure that all of the PET flake had been dissolved. During dissolution, the vessel was agitated by an anchor stirrer on an agitator shaft driven at 250 rpm. After dissolution was complete, the agitator was stopped. Entrained polyolefins, from black basecups, etc., were allowed to phase separate and form an upper layer. As the EC/PET layer was discharged through a bottom drain valve, the polyolefin layer preferentially wet the vessel walls, thereby retained in the vessel and separated from the EC/PET solution. After the run, the adhering polyolefins were removed by washing the vessel with hot mixed xylenes.

The EC/PET solution was then strained through a filter pack containing a 200 mesh stainless steel screen and support plate to remove any large insoluble particles. Further filtration was accomplished by passing the solution through a, sand bed. The sand bed consisted of a 1 ft long by 0.75 in. diameter oil jacketed tube. Hot oil at 225° C. was circulated through the jacket. The sand was a 35×70 mesh sharp filter grade sand and was retained by a 60 mesh screen at the bottom of the bed. The sand bed served to efficiently remove very small particles from the solution via depth filtration. Fine solid particles not captured by the filter pack and colloidal particles, such as insoluble transesterification catalyst from the PET, were removed by the sand bed. A small polishing filter (40 micron) was used after the sand bed to capture any sand particles escaping the bed.

After processing through the filter train, the EC/PET solution was added to a 1 gallon glass autoclave containing a 900 g heel of EC at 140° C. The autoclave was equipped with an agitator shaft, thermocouple, nitrogen purge, and internal baffles. This autoclave served as a precipitator for recovery of the PET. Temperature control was accomplished with via heating tape on the outside of the vessel. After adding the EC/PET solution over a period of 15 to 30 minutes, the precipitator was allowed to cool to 70° C. over a period of about 1 hour. The temperature in the precipitator initially rose as the hot PET/EC entered the vessel. However, as the solution cooled, PET precipitation began to occur at about 140° C. The PET slurry was then discharged into a Buchner funnel with Whatman No. 40 filter paper. Molten EC was drained from the filter cake. After the bulk of the EC had drained from filter cake, it was rinsed three times with 250 ml of technical grade acetone to remove EC adhering to the PET.

The PET product was dried overnight in a vacuum oven at 70° C. and 29 in mercury vacuum to remove residual solvent. The recovered PET (145 g) was then analyzed for IV and chlorine content by X-ray fluorescence. The recovered PET product had an IV of 0.181 dl/g, and contained 43 ppm chlorine. About 58 weight percent PET was recovered in the process. The PET product also exhibited the following color values: $R_d$=84.7, a=−1.54, and b=2.45.

EXAMPLE 3

A 250 g sample of clear, water washed, PCR PET flakes was spiked with 1 weight percent polyvinyl chloride bottle grade resin and 2 weight percent washed green PCR PET, based on estimated PET content in the PCR PET flake. A 1 weight percent spike of polyvinyl chloride corresponds to about 5600 ppm chlorine in the PCR PET. This material was not washed with THF and was directly dissolved in EC, as described in Example 2. Entrained polyolefins were removed, as described in Example 2. Recovery of dried PET was 188 g for an overall yield of 75 percent. The IV of the recovered PET was 0.240 dl/g. The chlorine content of the recovered PET was 2900 ppm. indicating that approximately half of the chlorine (which may serve as an indicator for the polyvinyl chloride) was rejected by the dissolution step. The recovered PET product exhibited the following color values: $R_d$ =83.2, a=−3.45, b=6.59.

EXAMPLE 4

A 250 g sample of clear, water washed, PCR PET flake was spiked with 1 weight percent polyvinyl chloride bottle grade resin and 2 weight percent washed green PCR PET, based on estimated PET content in the PCR PET flake. Further processing, including a THF chemical wash step, was then performed as in Example 2. Recovery of dried PET was 145 g for an overall yield of 58 percent. The IV of the PET recovered was 0.240 dl/g. The chlorine content of the recovered PET was 57 ppm. Although there is some baseline level of chlorine present, at least 99 weight percent of the chlorine was removed from the PET by the process. The recovered PET product exhibited the following color values: $R_d$=81.4, a=−2.88, b=4.28.

EXAMPLE 5

In this example, methyl ethyl ketone (MEK) was used as the chemical wash solvent instead of THF, and all other parameters were similar to Example 4. Recovery of dried PET was 132 g for an overall yield of 66 percent. The IV of the PET recovered was 0.295 dl/g. The chlorine content of the recovered PET was 91 ppm, indicating at least 98 weight percent of the chlorine was removed from the PET by the process.

EXAMPLE 6

In this example, cyclohexanone was used as the chemical wash solvent, and all other parameters were similar to Example 4. With cyclohexanone, the chemical wash solvent essentially dissolved all remaining polyolefins from the PET flake near the atmospheric boiling point of cyclohexanone. Use of cyclohexanone as the chemical wash solvent eliminated the need to remove solidified polyolefin from the dissolution/digester vessel, and facilitated separation of polyolefins from the PET. Approximately 0.4 weight percent PET was soluble in cyclohexanone at 155° C. so some PET yield was lost to the cyclohexanone solvent. Recovery of dried PET was 1.50 g for an overall yield of 60 percent. The IV of the recovered PET was 0.207. The chlorine content of the recovered PET was 66 ppm, indicating a chlorine removal of at least 99 weight percent. The recovered PET product exhibited the following color values: $R_d$=83.6, a=2.41, b=4.05.

EXAMPLE 7

The effect of water and ethylene glycol on the digestion step was investigated by adding 1000 ppm of water and 1000 ppm of ethylene/glycol (EG) to the EC before its addition to the digester vessel. The increased hydroxyl content of the solvent would be expected to react with the polyester and reduce the molecular weight of the polymer. Water levels were determined by Karl Fischer titration and ethylene glycol content by gas chromatography. Other parameters in the run were similar to Example 4. The yield of the dried polymer after processing was 77% with an IV of 0.212 dl/g, and the chlorine content was 38 ppm.

EXAMPLE 8

The effect of low water and ethylene glycol content was tested by treating the ethylene carbonate to a content of less than 35 and 25 ppm of water and ethylene glycol, respectively. The 250 g PET sample, dried as previously described, was then processed as in Example 4. The effect of the lowered hydroxyl content was evident as the IV of the recovered product was 0.274 dl/g and an overall yield of 94% was achieved. The chlorine content of the polymer was typical (48 ppm) and the recovered PET product exhibited the following color values: $R_d$=82.2, a=−3.49, b=5.29.

EXAMPLE 9

An experiment similar to Examples 7 and 8 was run except that only water was back added to a level of 1000 ppm. The ethylene glycol content was 25 ppm or less. The resulting powder had an IV of 0.204 dl/g and a yield of 81%. The recovered PET exhibited the following color values: $R_d$=78.4, a=−1.54, b=5.47.

EXAMPLE 10

The effectiveness of ethylene glycol in lowering molecular weight was determined by adding approximately 1000 ppm ethylene glycol to ethylene carbonate and making another run similar to Example 4. Water was held to a level of 35 ppm or less as determined by Karl Fischer titration. The recovered polymer had an IV of 0.310 dl/g, and an overall recovery of 82 %. The recovered PET exhibited the following color values: $R_d$ =81.7, a=−2.2, b=6.33.

EXAMPLE 11

Dimethylphthalate (DMP) was also investigated as a selective solvent. The only preparation of the solvent was drying it over type 4A molecular sieves. The clear PCR sample was prepared with the addition of 1% PVC only before THF washing. The washed flakes were transferred to a vacuum oven where they were held at 70° C. and 29 inches mercury vacuum overnight to remove residual THF. A 200 g sample of the cleaned polymer was then charged to the 2 liter autoclave and processed with 1420 g of the dried dimethylphthalate. The dissolution was carried out at 205° C. for approximately 90 minutes. After dissolution was complete, the agitator was stopped. Entrained polyolefins (from black basecups, etc.) were allowed to phase separate and form an upper layer. The DMP/PET layer was then discharged through the bottom of the vessel.

The PET/DMP solution was processed through the filter pack and columns as described in Example 2. The precipitator had a heel containing 900 g of DMP at 150 C. After batching in the hot DMP/PET mixture, the crystallizer was discharged when the mixture had cooled to 150° C. After drying, 196 g of PET was recovered for an overall yield of 98%. The recovered PET product had an IV of 0.752, and exhibited the following color values: $R_d$=83.6, a=−2.41, b=4.05.

EXAMPLE 12

An experiment similar to Example 8 was run on PCR clear flake with a PVC spike but without any green flake. The recovered PET product had an IV of 0.585 dl/g and exhibited the following color values: $R_d$=80.4, a=−0.95, b=4.92.

Summary of the Results of Examples 1–12.

The results of the Examples above are summarized in Table 1. Example 1 is considered comparative, and the remaining examples are considered exemplary of the invention.

TABLE 1

| Ex. | PET FEED TYPE | PET FEED IV (dl/g) | PET FEED Cl (ppm) | SOLVENTS CHEMICAL WASH | SOLVENTS SELECTIVE SOLVENT | SOLVENTS SELECTIVE SOLVENT IMPURITIES | PET PRODUCT PET RECOVERY (wt %) | PET PRODUCT IV (dl/g) | PET PRODUCT Cl (ppm) | Color $R_d$ | Color a | Color b |
|---|---|---|---|---|---|---|---|---|---|---|---|---|
| 1 | PCR Clear | 0.765 | 45–65 | None | EC | <35 ppm $H_2O$ <25 ppm EG | 76 | 0.587 | <25 | 70.7 | −1.00 | 3.24 |
| 2 | PCR Clear | 0.768 | 45–65 | THF | EC | 500–700 ppm EG <35 ppm $H_2O$ | 58 | 0.181 | 43 | 84.7 | −1.54 | 2.45 |
| 3 | PCR Clear +1 wt % PVC +2 wt % green | 0.768 | ~5600 | None | EC | 500–700 ppm EG <35 ppm $H_2O$ | 75 | 0.156 | 2900 | 83.2 | −3.45 | 6.59 |
| 4 | PCR Clear +1 wt % PVC +2 wt % green | 0.768 | ~5600 | THF | EC | 500–700 ppm EG <35 ppm $H_2O$ | 58 | 0.240 | 57 | 81.4 | −2.88 | 4.28 |
| 5 | PCR Clear +1 wt % PVC +2 wt % green | 0.768 | ~5600 | MEK | EC | 500–700 ppm EG <35 ppm $H_2O$ | 53 | 0.295 | 91 | — | — | — |
| 6 | PCR Clear +1 wt % PVC +2 wt % green | 0.768 | ~5600 | Cyclohexanone | EC | 500–700 ppm EG <35 ppm $H_2O$ | 60 | 0.207 | 66 | 83.6 | −2.41 | 4.05 |
| 7 | PCR Clear +1 wt % PVC +2 wt % green | 0.765 | ~5600 | THF | EC | 1000 ppm $H_2O$, 1000 ppm EG | 77 | 0.212 | 38 | — | — | — |
| 8 | PCR Clear +1 wt % PVC +2 wt% green | 0.765 | ~5600 | THF | EC | <35 ppm $H_2O$ <25 ppm EG | 94 | 0.274 | 48 | 82.2 | −3.49 | 5.29 |
| 9 | PCR Clear +1 wt % PVC +2 wt % green | 0.765 | ~5600 | THF | EC | 1000 ppm $H_2O$ <25 ppm EG | 81 | 0.204 | N/A | 78.4 | −1.54 | 5.47 |
| 10 | PCR Clear +1 wt % PVC +2 wt % green | 0.765 | ~5600 | THF | EC | <35 ppm $H_2O$ 1000 ppm EG | 82 | 0.310 | N/A | 81.7 | −2.20 | 6.33 |
| 11 | PCR Clear | 0.765 | 45–65 | THF | DMP | N/A | 98 | 0.752 | <25 | 83.6 | −2.41 | 4.05 |
| 12 | PCR Clear +1 wt % PVC | 0.765 | ~5600 | THF | EC | <35 ppm $H_2O$ <25 ppm EG | 97 | 0.585 | <25 | 80.4 | −0.95 | 4.92 |

EXAMPLE 13

To determine whether dissolution in the selective solvent has an impact on the polydispersity of the recycle PET polymer product, samples of PET with a wide molecular weight distribution were subjected to the PET digestion step, using various selective solvents, and then recovered.

The PET sample having a wide (bimodal) molecular weight distribution was prepared by combining one PET polymer with a number average molecular weight ($M_n$) of about 24.000 with another low molecular weight PET polymer with a $M_n$ of about 1600, to ratio of weight average molecular weight ($M_w$) to $M_n$, or polydispersity ($M_w/M_n$) of about 3.3, as determined by GPC.

Small amounts (about 45 g) of the mixed PET were combined with small amounts (about 145 g) of each of five selective solvents: ethylene carbonate (EC), propylene carbonate (PC), dimethyl phthalate (DMP), dimethyl isophthalate (DMI), and a mixture of dimethyl terephthalate and diethyl terephthalate (DIVIT/DET) combined in a 50:50 weight ratio. Each sample was digested in the selective solvent for a specified time at 220° C. and then cooled to slightly above room temperature to allow precipitation and recovery of the PET. The samples dissolved in EC or PC were digested for 30 minutes. The samples dissolved in the remaining solvents were digested for 2 hours. The recovered PET was washed three times with acetone, filtered under suction to allow air drying for about 20 minutes, and then dried for an hour at 80° C. in a vacuum oven under 29 inches mercury vacuum to remove the acetone. The samples were then analyzed for molecular weight. Results are shown in Table 2.

As can be seen from Table 2, the aromatic ester selective solvents showed good retention of the theoretical $M_n$ of the PET sample charged to the digestion step. The alkylene carbonate selective solvents reduced the theoretical $M_n$ of the PET sample charged to the digestion step, due to reaction of the polymer with hydrolytic impurities entrained in the alkylene carbonates. However, the alkylene carbonates also collapsed the bimodal molecular weight distribution of the mixed PET polymer charged, resulting in PET with a polydispersity of about 2, typical of that for virgin melt polymerized PET polymers. The aromatic ester solvents were less effective at equilibrating the high molecular weight components, even though the digestion step was conducted over a longer time period.

While certain representative embodiments and details have been shown for the purpose of illustrating the invention, it will be apparent to those skilled in the art that various changes and modifications may be made therein without departing from the spirit or scope of the invention.

TABLE 2

| Selective Solvent | $M_n$ | $M_w$ | $M_p$ | $M_z$ | $M_w/M_n$ | Digest Time (hrs) |
|---|---|---|---|---|---|---|
| EC | 4577 | 8558 | 8579 | 13176 | 1.9 | 0.5 |

TABLE 2-continued

| Selective Solvent | $M_n$ | $M_w$ | $M_p$ | $M_z$ | $M_w/M_n$ | Digest Time (hrs) |
|---|---|---|---|---|---|---|
| PC | 4654 | 9795 | 10641 | 15897 | 2.1 | 0.5 |
| DMP | 6996 | 17930 | 23547 | 29094 | 2.6 | 2 |
| DMT/DET | 6402 | 17127 | 22772 | 29174 | 2.7 | 2 |
| DMI | 6950 | 19486 | 27116 | 32267 | 2.8 | 2 |

What is claimed is:

1. A process for recovering a polyester polymer from a mixed polymer recycle stream, while maintaining the polyester polymer in polymer form, comprising:

contacting a mixed polymer recycle stream comprising at least 50 weight percent polyester polymer, lesser portions of other polymers, including one or more polyolefins, and impurities, with a chemical wash solvent that dissolves at least a portion of the impurities present in the mixed polymer recycle stream and substantially rejects dissolution of the polyester polymer present in the mixed polymer recycle stream, to form a chemical wash solution containing impurities dissolved in the chemical wash solvent, and a residual mixed polymer recycle stream;

separating the chemical wash solution from the residual mixed polymer recycle stream;

contacting, at an elevated temperature, the residual mixed polymer recycle stream with a selective solvent that selectively dissolves the polyester polymer and substantially rejects dissolution of any other polymer present in the mixed polymer recycle stream, to form a residual waste stream, a separate polyolefin phase, and a selective solvent solution comprising the polyester polymer dissolved in the selective solvent;

separating the selective solvent solution from the separate polyolefin phase, and from the residual waste stream; and precipitating the polyester polymer from the selective solvent solution, to form a precipitated polyester polymer and a spent selective solvent solution; and separating the spent selective solvent from the precipitated polyester polymer, to obtain a recovered polyester polymer product having an intrinsic viscosity of from about 0.2 dl/g to about 0.8 dl/g.

2. The process of claim 1 wherein the recovered polyester polymer is combined, in a melt processing operation, with a virgin polyester polymer stream having a comparable molecular weight to produce a recycle-content polyester polymer product containing at least 15 weight percent of the polyester polymer recovered from the mixed polymer recycle stream.

3. The process of claim 2 wherein the recycle-content polyester polymer product is further polymerized to increase its molecular weight.

4. The process of claim 2 wherein the chemical wash solvent is selected from the group consisting of methyl ethyl ketone, tetrahydrofuran, hexanones, 1,4-dioxane, diethoxymethane, and mixtures thereof.

5. The process of claim 4 wherein the selective solvent is selected from the group consisting of dialkyl terephthalates, dialkyl phthalates, dialkyl isophthalates, dialkyl naphthalates, alkylene carbonates, and mixtures thereof.

6. The process of claim 5 wherein the mixed polymer recycle stream includes polyvinyl chloride polymer, and the chemical wash solvent dissolves the polyvinyl chloride, in addition to impurities present in the mixed polymer recycle stream, to form a chemical wash solution containing impurities and polyvinyl chloride dissolved in the chemical wash solvent.

7. The process of claim 2 wherein the recovered polyester polymer is combined with the virgin polyester in a polymerization reactor in a melt processing operation.

8. The process of claim 2 wherein the recovered polyester polymer is combined with the virgin polyester in an extrusion step in a melt processing operation.

9. The process of claim 2 wherein the recovered polyester polymer is combined with the virgin polyester in a spinning step in a melt processing operation.

10. The process of claim 2 wherein the selective solvent is selected from the group consisting of dimethyl terephthalate, dimethyl phthalate, dimethyl isophthalate, dimethyl naphthalate, ethylene carbonate, propylene carbonate, and mixtures thereof.

11. The process of claim 10 wherein the chemical wash solvent is selected from the group consisting of methyl ethyl ketone, tetrahydrofuran, and mixtures thereof.

12. The process of claim 2 wherein the mixed polymer recycle stream comprises at least 65 weight percent polyethylene terephthalate.

13. A process for recovering a polyester polymer from a mixed polymer recycle stream, while maintaining the polyester polymer in polymer form, comprising:

contacting a mixed polymer recycle stream comprising at least 65 weight percent polyester polymer, lesser portions of other polymers, including one or more polyolefins, and impurities, with a chemical wash solvent selected from the group consisting of methyl ethyl ketone, tetrahydrofuran, and mixtures thereof, to form a chemical wash solution containing impurities dissolved in the chemical wash solvent, and a residual mixed polymer recycle stream;

separating the chemical wash solution from the residual mixed polymer recycle stream;

contacting, at an elevated temperature, the residual mixed polymer recycle stream with a selective solvent selected from the group consisting of dimethyl terephthalate, dimethyl phthalate, dimethyl isophthalate, dimethyl naphthalate, ethylene carbonate, propylene carbonate, and mixtures thereof, to form a residual waste stream, a separate polyolefin phase, and a selective solvent solution comprising the polyester polymer dissolved in the selective solvent;

separating the selective solvent solution from the separate polyolefin phase, and from the residual waste stream; and precipitating the polyester polymer from the selective solvent solution, to form a precipitated polyester polymer and a spent selective solvent solution;

separating the spent selective solvent from the precipitated polyester polymer, to obtain a recovered polyester polymer product having an intrinsic viscosity of from about 0.2 dl/g to about 0.8 dl/g; and combining the recovered polyester polymer, in a melt processing operation, with a virgin polyester polymer stream having a comparable molecular weight to produce a recycle-content polyester polymer product containing from about 15 weight percent to about 55 weight percent of the polyester polymer recovered from the mixed polymer recycle stream.

14. The process of claim 13 wherein the chemical wash solvent is contacted with the mixed polymer recycle stream at a temperature in the range of from about 25° C. to about 100° C.

15. The process of claim 14 wherein the selective solvent is contacted with the mixed polymer recycle stream at a temperature in the range of from about 140° C. to about 285° C.

16. The process of claim 15 wherein the polyester polymer is present in the selective solvent solution at a concentration of from about 10 weight percent to about 40 weight percent.

17. The process of claim 16 wherein the polyester polymer is precipitated from the selective solvent solution by cooling the selective solution to a temperature in the range of from about 60° C. to about 170° C.

18. The process of claim 17 wherein the chemical wash solvent is methyl ethyl ketone, and the selective solvent is selected from the group consisting of dimethyl terephthalate, dimethyl phthalate, dimethyl isophthalate, and mixtures thereof.

19. The process of claim 17 wherein the chemical wash solvent is methyl ethyl ketone, and the selective solvent is selected from the group consisting of ethylene carbonate, propylene carbonate, and mixtures thereof.

20. The process of claim 19 wherein the level of impurities present in the selective solvent is used to control the intrinsic viscosity of the recovered polyester polymer product.

21. The process of claim 17 wherein the recycle-content polyester polymer product is further polymerized to increase its molecular weight.

22. The process of claim 17 wherein the mixed polymer recycle stream comprises at least 80 weight percent polyethylene terephthalate.

23. The process of claim 17 wherein the mixed polymer recycle stream includes polyvinyl chloride polymer, and the chemical wash solvent dissolves the polyvinyl chloride, in addition to impurities present in the mixed polymer recycle stream, to form a chemical wash solution containing impurities and polyvinyl chloride dissolved in the chemical wash solvent.

24. A process for recovering a polyester polymer from a mixed polymer recycle stream, while maintaining the polyester polymer in polymer form, comprising:

contacting, at a first elevated temperature, a mixed polymer recycle stream comprising at least 50 weight percent polyester polymer, lesser portions of other polymers, including one or more polyolefins, and impurities, with a chemical wash solvent that dissolves any polyolefins present, and at least a portion of the impurities present in the mixed polymer recycle stream, and substantially rejects dissolution of the polyester polymer present in the mixed polymer recycle stream, to form a residual polymer recycle stream and a chemical wash solution comprising polyolefin polymer and impurities dissolved in the chemical wash solvent;

separating the chemical wash solution from the residual polymer recycle stream;

contacting, at a second elevated temperature, the residual polymer recycle stream with a selective solvent that selectively dissolves the polyester polymer and substantially rejects dissolution of other polymers present in the mixed polymer recycle stream, to form a selective solvent solution containing the polyester polymer dissolved in the selective solvent, and a residual waste stream;

separating the selective solvent solution from the residual waste stream;

precipitating the polyester polymer from the selective solvent solution, to form a precipitated polyester polymer and a spent selective solvent solution; and separating the spent selective solvent from the precipitated polyester polymer, to obtain a recovered polyester polymer product having an intrinsic viscosity of from about 0.2 dl/g to about 0.8 dl/g.

25. The process of claim 24 wherein the recovered polyester polymer is combined, in a melt processing operation, with a virgin polyester polymer stream having a comparable molecular weight to produce a recycle-content polyester polymer product containing at least 15 weight percent of the polyester polymer recovered from the mixed polymer recycle stream.

26. The process of claim 25 wherein the recycle-content polyester polymer product is further polymerized to increase its molecular weight.

27. The process of claim 25 wherein the chemical wash solvent is selected from the group consisting of cyclohexanone, alkyl-substituted cyclohexanones, diol diacetates, dibutyl phthalate, and mixtures thereof.

28. The process of claim 27 wherein the selective solvent is selected from the group consisting of dialkyl terephthalates, dimethyl phthalate, dialkyl isophthalates, dialkyl naphthalates, alkylene carbonates, and mixtures thereof.

29. The process of claim 28 wherein the mixed polymer recycle stream includes polyvinyl chloride polymer, and the chemical wash solvent dissolves the polyvinyl chloride, in addition to impurities present in the mixed polymer recycle stream, to form a chemical wash solution containing impurities and polyvinyl chloride dissolved in the chemical wash solvent.

30. The process of claim 25 wherein the recovered polyester polymer is combined with the virgin polyester in a polymerization reactor in a melt processing operation.

31. The process of claim 25 wherein the recovered polyester polymer is combined with the virgin polyester in an extrusion step in a melt processing operation.

32. The process of claim 25 wherein the recovered polyester polymer is combined with the virgin polyester in a spinning step in a melt processing operation.

33. The process of claim 25 wherein the chemical wash solvent is cyclohexanone and the selective solvent is selected from the group consisting of dimethyl terephthalate, dimethyl phthalate, dimethyl isophthalate, dimethyl naphthalate, and mixtures thereof.

34. The process of claim 25 wherein the chemical wash solvent is cyclohexanone and the selective solvent is selected from the group consisting of ethylene carbonate, propylene carbonate, and mixtures thereof.

35. The process of claim 25 wherein the mixed polymer recycle stream comprises at least 65 weight percent polyethylene terephthalate.

36. A process for recovering a polyester polymer from a mixed polymer recycle stream, while maintaining the polyester polymer in polymer form, comprising:

contacting, at a first elevated temperature, a mixed polymer recycle stream comprising at least 50 weight percent polyester polymer, lesser portions of other polymers, including one or more polyolefins, and impurities, with a chemical wash solvent selected from the group consisting of cyclohexanone, alkyl-substituted cyclohexanones, diol diacetates, dibutyl phthalate, and mixtures thereof, to form a residual polymer recycle stream and a chemical wash solution comprising polyolefin polymer and impurities dissolved in the chemical wash solvent;

separating the chemical wash solution from the residual polymer recycle stream;

contacting, at a second elevated temperature, the residual polymer recycle stream with a selective solvent selected from the group consisting of dialkyl terephthalates, dimethyl phthalate, dialkyl isophthalates, dialkyl naphthalates, alkylene carbonates, and mixtures thereof, to form a selective solvent solution containing the polyester polymer dissolved in the selective solvent, and a residual waste stream;

separating the selective solvent solution from the residual waste stream;

precipitating the polyester polymer from the selective solvent solution, to form a precipitated polyester polymer and a spent selective solvent solution;

separating the spent selective solvent from the precipitated polyester polymer, to obtain a recovered polyester polymer product having an intrinsic viscosity of from about 0.2 dl/g to about 0.8 dl/g; and combining the recovered polyester polymer, in a melt processing operation, with a virgin polyester polymer stream having a comparable molecular weight to produce a recycle-content polyester polymer product containing from about 15 weight percent to about 55 weight percent of the polyester polymer recovered from the mixed polymer recycle stream.

37. The process of claim 36 wherein the chemical wash solvent is contacted with the mixed polymer recycle stream at a temperature in the range of from about 30° C. to about 200° C.

38. The process of claim 37 wherein the selective solvent is contacted with the mixed polymer recycle stream at a temperature in the range of from about 140° C. to about 285° C.

39. The process of claim 38 wherein the polyester polymer is present in the selective solvent solution at a concentration of from about 10 weight percent to about 40 weight percent.

40. The process of claim 39 wherein the polyester polymer is precipitated from the selective solvent solution by cooling the selective solution to a temperature in the range of from about 60° C. to about 170° C.

41. The process of claim 36 wherein the chemical wash solvent is cyclohexanone and the selective solvent is selected from the group consisting of dimethyl terephthalate, dimethyl phthalate, dimethyl isophthalate, dimethyl naphthalate, and mixtures thereof.

42. The process of claim 36 wherein the chemical wash solvent is cyclohexanone and the selective solvent is selected from the group consisting of ethylene carbonate, propylene carbonate, and mixtures thereof.

43. The process of claim 42 wherein the level of impurities present in the selective solvent is used to control the intrinsic viscosity of the recovered polyester polymer product.

44. The process of claim 36 wherein the recycle-content polyester polymer product is further polymerized to increase its molecular weight.

45. The process of claim 36 wherein the mixed polymer recycle stream comprises at least 80 weight percent polyethylene terephthalate.

46. The process of claim 36 wherein the mixed polymer recycle stream includes polyvinyl chloride polymer, and the chemical wash solvent dissolves the polyvinyl chloride, in addition to impurities present in the mixed polymer recycle stream, to form a chemical wash solution containing impurities and polyvinyl chloride dissolved in the chemical wash solvent.

47. A process for recovering a polyester polymer from a mixed polymer recycle stream, while maintaining the polyester polymer in polymer form, comprising:

contacting, at an elevated temperature, a mixed polymer recycle stream comprising at least 50 weight percent polyester polymer, lesser portions of other polymers, including one or more polyolefins, and impurities, with a selective solvent that selectively dissolves the polyester polymer and substantially rejects dissolution of the other polymers and impurities present in the mixed polymer recycle stream, to form a residual waste stream, a separate polyolefin phase, and a selective solvent solution comprising the polyester polymer dissolved in the selective solvent;

separating the selective solvent solution from the separate polyolefin phase, and from the residual waste stream;

precipitating the polyester polymer from the selective solvent solution, to form a precipitated polyester polymer and a spent selective solvent solution;

separating the spent selective solvent and the precipitated polyester polymer, to obtain a recovered polyester polymer product having an intrinsic viscosity of from about 0.2 dl/g to about 0.6 dl/g; and combining, in a melt processing operation, the recovered polyester polymer product with a virgin polyester polymer product having a comparable intrinsic viscosity, to produce a recycle-content polyester polymer product containing at least 15 weight percent of the polyester polymer recovered from the mixed polymer recycle stream.

* * * * *